United States Patent
Ayukawa

(10) Patent No.: US 6,767,303 B2
(45) Date of Patent: Jul. 27, 2004

(54) AUTOTENSIONER

(75) Inventor: Kazumasa Ayukawa, Nara (JP)

(73) Assignee: Unitta Company, Osaka (JP)

( * ) Notice: Subject to any disclaimer, the term of this patent is extended or adjusted under 35 U.S.C. 154(b) by 0 days.

(21) Appl. No.: 10/058,849

(22) Filed: Jan. 30, 2002

(65) Prior Publication Data

US 2003/0022746 A1 Jan. 30, 2003

(30) Foreign Application Priority Data

Jul. 27, 2001 (JP) .................................. P2001-227584

(51) Int. Cl.⁷ .............................................. F16H 7/12
(52) U.S. Cl. ...................................................... 474/135
(58) Field of Search ................................. 474/135, 133, 474/109, 136, 117, 138, 101, 112

(56) References Cited

U.S. PATENT DOCUMENTS

| | | | |
|---|---|---|---|
| 4,698,049 A | | 10/1987 | Bytzek et al. |
| 4,723,934 A | | 2/1988 | Thomey |
| 5,236,396 A | | 8/1993 | Golovatai-Schmidt et al. |
| 5,334,109 A | * | 8/1994 | Izutsu et al. ................. 474/135 |
| 5,470,280 A | | 11/1995 | Ayukawa |
| 5,478,285 A | | 12/1995 | Bakker et al. |
| 5,599,245 A | | 2/1997 | Giese |
| 5,772,549 A | * | 6/1998 | Berndt et al. ................. 474/135 |
| 5,803,849 A | | 9/1998 | Ayukawa |
| 5,967,919 A | * | 10/1999 | Bakker ........................ 474/135 |
| 6,102,820 A | * | 8/2000 | Imaharu et al. ............. 474/135 |
| 6,264,578 B1 | | 7/2001 | Ayukawa |
| 6,458,055 B1 | * | 10/2002 | Bellamy-Booth ........... 474/135 |
| 6,497,632 B2 | * | 12/2002 | Ayukawa et al. ........... 474/135 |

FOREIGN PATENT DOCUMENTS

| | | | |
|---|---|---|---|
| DE | 19953379 | 5/2001 | |
| EP | 0 450620 A1 * | 10/1991 | ............. F16H/7/12 |
| EP | 0509313 | 10/1992 | |
| EP | 0907040 | 4/1999 | |
| JP | 8-233043 | 9/1996 | |
| JP | 8-338487 | 12/1996 | |
| JP | 10-306861 A * | 11/1998 | ............. F16H/7/12 |
| JP | 11-141630 A * | 5/1999 | ............. F16H/7/12 |
| JP | 2001173737 | 6/2001 | |
| JP | 2001-163196 A * | 6/2002 | ............. F16H/7/12 |
| WO | 95/29347 | 11/1995 | |

OTHER PUBLICATIONS

English Language Abstract of EP 0 509 313.
English Language Abstract of DE 199 53 379.
English Language Abstract of JP 2001–173737.

* cited by examiner

Primary Examiner—Marcus Charles
(74) Attorney, Agent, or Firm—Greenblum & Bernstein, P.L.C.

(57) ABSTRACT

An autotensioner comprises a cup-shaped stationary member, an arm rotatably attached to an opening of the stationary member. An axial bore is formed in the bottom of the stationary member. A rocking wall extending to the bottom is provided at the arm. A first friction member is provided between the rocking wall and the inner wall of the opening. The first friction member is gripped between the rocking wall and the inner wall. A rocking shaft extending to the bottom is provided at the center of a lid portion of the arm. The rocking shaft is inserted in the axial bore. A second friction member is provided between the rocking shaft and the axial bore. The first friction member and the second friction member are formed of a synthetic resin mainly comprised of PPS, exhibit high limited PV factors, and exhibit low coefficients of friction.

9 Claims, 10 Drawing Sheets

| FREQUENCY (Hz) | NORMAL-ROTATION DAMPING FORCE (N) | REVERSE-ROTATION DAMPING FORCE (N) |
|---|---|---|
| 0.02 | 150 | 60 |
| 5 | 273 | 143 |
| 10 | 340 | 150 |
| 20 | 349 | 143 |
| 30 | 357 | 143 |

AUTOTENSIONER

BACKGROUND OF THE INVENTION

1. Field of the Invention

The present invention relates to an autotensioner used in a belt system for transmitting drive power of, for example, an automobile engine to a driven pulley by a transmission belt.

2. Description of the Related Art

Conventionally, there is known an autotensioner, which is provided in a driven apparatus for transmitting drive power of an automobile engine to a plurality of equipments through a transmission belt, to reliably transmit the drive power to each of the equipments by imparting tension to the transmission belt. Such an autotensioner is provided with a stationary member so that it can be fixed to an engine block, for example, an arm rocking with respect to the stationary member, and a pulley attached rotatably to the arm. A torsion coil spring, for example, is housed in the stationary member so as to give tension to the transmission belt through the pulley.

In such an autotensioner, when the transmission belt vibrates, the arm rocks and a load acts between the arm and stationary member. To counter this load and attenuate the vibration of the belt and to prevent damage caused by contact between the arm and the stationary member, a friction member formed from a synthetic resin, for example, is fixed to the arm, and slides against the stationary member when the arm rocks. For the engagement of the friction member, it is known to use a C-spring biasing the friction member from the inside thereof by a substantially constant pressure. For example, this configuration is disclosed in Japanese Unexamined Patent Publication (Kokai) No. 8-338487.

However, a C-spring has to be set in material and shape in accordance with the required pressure. Further, it is necessary to provide a structure for engaging the C-spring with the friction member. Thus, when using a C-spring, there are the problems of a complicated configuration and increased manufacturing cost.

SUMMARY OF THE INVENTION

Therefore, an object of the present invention is to provide an autotensioner in which a friction member is fixed by a simple structure without using a C-spring to generate the required damping force.

According to the present invention, there is provided a cup-shaped stationary member, an arm, a pulley, and a first friction member.

The cup-shaped stationary member has an opening and a bottom, in which an axial bore is formed. The arm is attached to the opening. The arm has a rocking shaft, which extends to the bottom and is inserted into the axial bore, so that the arm rocks about the rocking shaft. The arm has a stub shaft offset from the rocking shaft and extending in the opposite direction to the rocking shaft. The pulley rotates about the stub shaft and gives a tension to a transmission belt. The first friction member is provided between an annular wall of the stationary member, which is positioned close to the opening, and a rocking wall formed on the arm, to generate a first frictional resistance by rocking of the arm.

By the simple structure in which the friction member is gripped between the circumferential wall and the rocking wall, a damping force is generated.

The autotensioner may be provided with a second friction member interposed between the axial bore and the rocking shaft to generate a second frictional resistance by rocking of the arm. By providing this second friction member, along with the first friction member, the rocking of the arm is attenuated.

Preferably, the first friction member has a friction surface generating the first frictional resistance with the rocking wall by rocking of the arm, and the area of the friction surface is set to a size in accordance with a maximum load acting on the first friction member.

The area of the friction surface of the first friction member may be determined by the following formula:

$$A = \{(a+b)/a\} \times F/P$$

wherein A is the area of the friction surface of the first friction member, a is the distance from a first peak position where a maximum load acts on the second friction member to a second peak position where a maximum load acts on the first friction member, b is the distance from the second peak position to a third peak position where a maximum load acts on the pulley, F is a maximum load acting on the pulley, and P is a withstand pressure of the first friction member.

Preferably, the first friction member is made of a synthetic resin mainly comprised of polyphenyl sulfone, and the synthetic resin exhibits a limited PV factor substantially exceeding 2.0 MPa·m/sec when sliding against the arm at a speed of substantially 0.5 m/sec. By making the first friction member of a material with a high limited PV factor, a sufficient durability can be exhibited against rocking of the arm.

The rocking wall and the annular wall may face each other and be substantially parallel, and the first friction member may have a bearing portion formed in a tubular shape between the rocking wall and the annular wall. Such a first friction member is easy to form.

The rocking wall may face the annular wall at a slant, and the first friction member may have a bearing portion formed in a taper between the rocking wall and the annular wall. Such a first friction member can exhibit a high durability with respect to the radial load by adjusting the thickness of the shaft member in accordance with the distribution of the load acting on the bearing portion.

Preferably, a normal-rotation damping force, acting on the arm when the arm moves in a first direction in which the transmission belt slacks, is greater than a reverse-rotation damping force, acting on the arm when the arm moves in a second direction in which the transmission belt is tensioned.

Further, preferably, a dynamic damping force acting on the arm is greater than a static damping force acting on the arm. In this case, the dynamic damping force is more than two times the static damping force.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
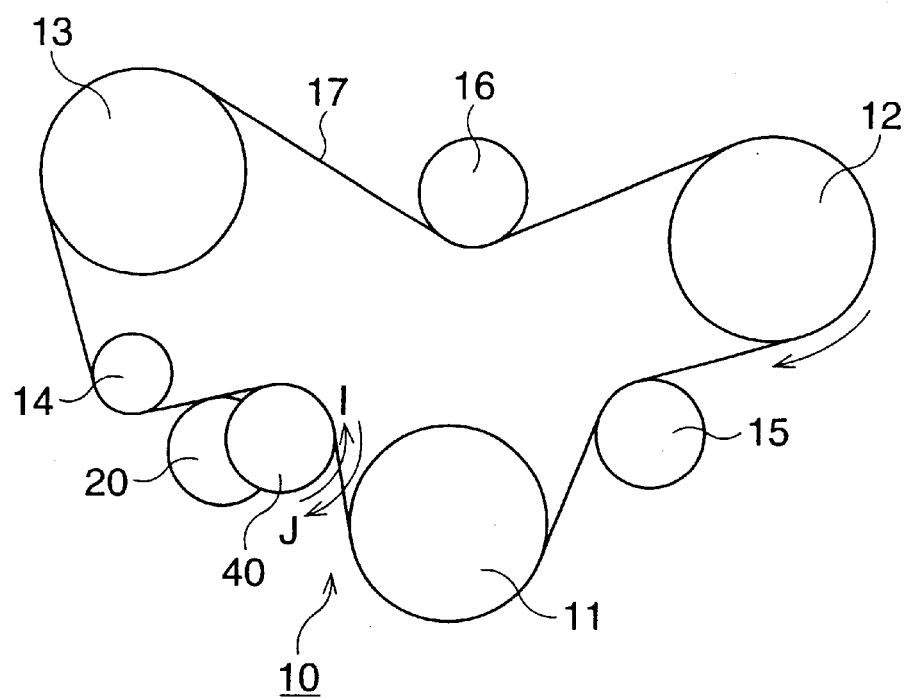
FIG. 1 is a view of a belt system of an automobile engine to which an autotensioner of a first embodiment is provided.

The present invention will be described below with reference to embodiments shown in the drawings.

Figure 2:
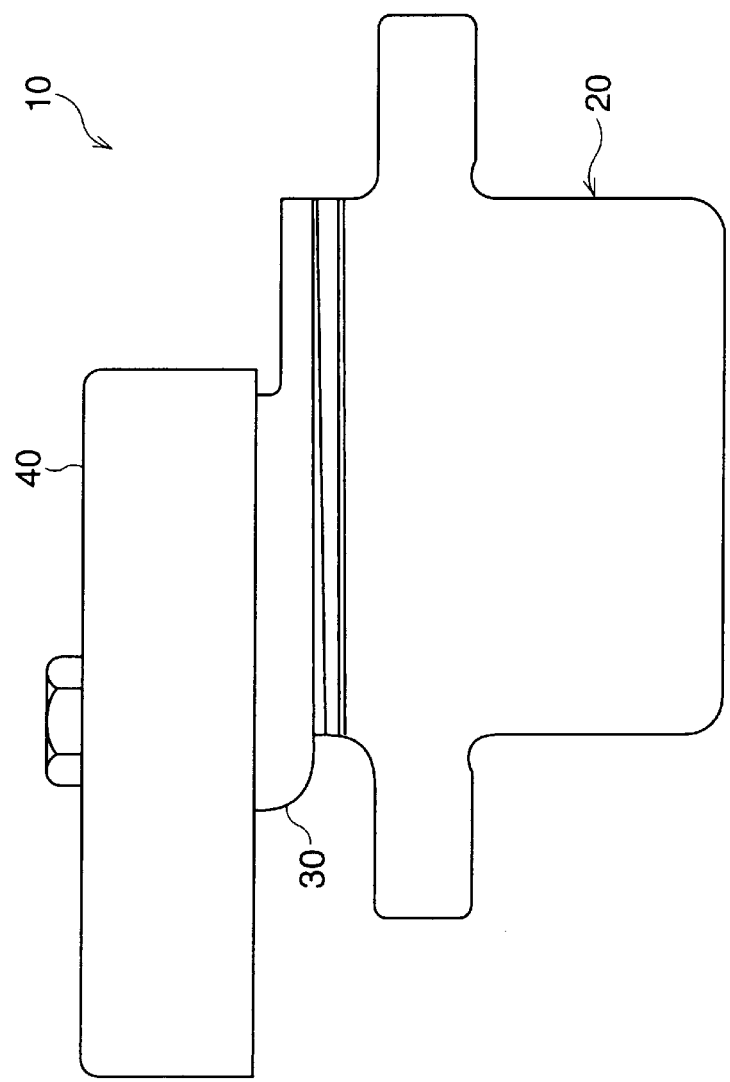
FIG. 2 is a view of the outside appearance of an autotensioner of the first embodiment.

FIG. 1 is a view of a belt system of an automobile engine to which an autotensioner of a first embodiment is provided, while FIG. 2 is a view of the outer appearance of the autotensioner.

An autotensioner 10 is mounted in the belt system shown in FIG. 1. The belt system is provided with a drive pulley 11 attached to an output shaft of the engine, an air-conditioner pulley 12, a power steering system pulley 13, an alternator pulley 14, idler pulleys 15 and 16, and the autotensioner or tensioner 10. An endless transmission belt 17 is wrapped around the pulleys. Rotational drive force of the drive pulley 11 is transmitted to the other pulleys by the transmission belt 17. The transmission belt 17 is driven in the clockwise direction in the drawing. The tensioner 10 biases the transmission belt 17 from the outside to impart tension to the transmission belt 17.

As shown in FIG. 2, the tensioner 10 has a cup-shaped stationary member 20, which is fixed to the engine block (not shown). An arm 30 is swingably or rockably attached to the stationary member 20, while a pulley 40 is rotatably supported by the arm 30. As shown in FIG. 1, a transmission belt 17 is wrapped around the outer circumference of the pulley 40, and the pulley 40 rotates along with the rotation of the transmission belt 17. A torsion coil spring (not shown) is housed in the stationary member 20, so that the pulley 40 is biased in a direction imparting tension to the transmission belt 17 by this biasing force. The arm 30 rocks or moves in an I direction in which the transmission belt 17 slacks, and in a J direction in which the transmission belt 17 tensions.

Figure 3:
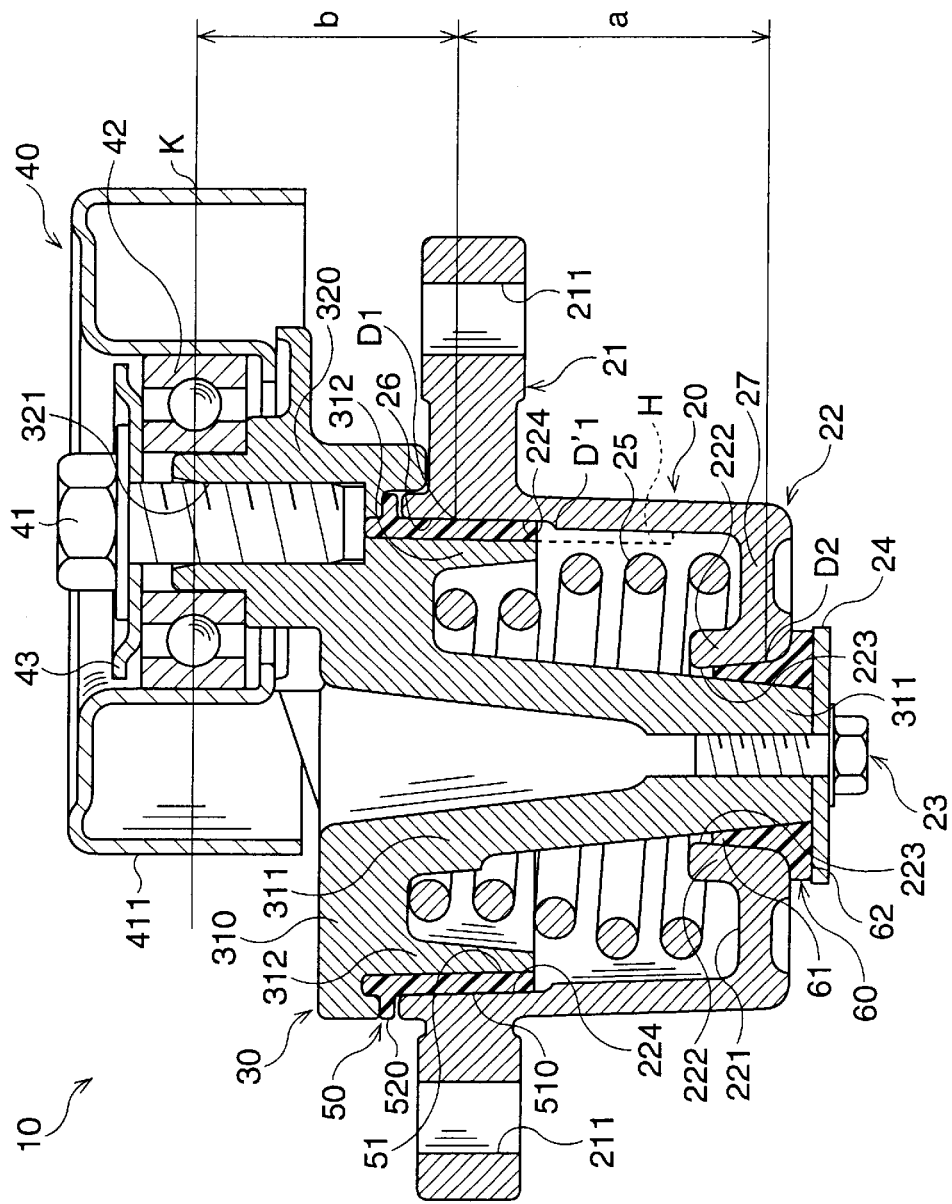
FIG. 3 is a sectional view of an autotensioner of the first embodiment.

FIG. 3 shows a cross-section of the tensioner 10. The stationary member 20 has a mounting portion 21 and a cup 22, which has an opening 26 and a bottom 27. The mounting portion 21 has mounting holes 211 for fixing the stationary member 20 to the engine block.

The cup 22 is provided with a bearing engagement portion 222 extending from the center of the bottom 27 toward the opening 26. The bearing engagement portion 222 has an axial bore 223.

The arm 30 is attached to the opening 26, and can rock about the axis of the cup 22, or the axis of a rocking shaft 311 and rocking wall 312, which are described later. The arm 30 has a lid portion 310, the rocking shaft 311, and a stub shaft 320. The lid portion 310 is rotatably supported by the opening 26 through a first friction member 50 described later. The rocking shaft 311 extends toward the bottom 27, and the stub shaft 320 offsets from the rocking shaft 311, and extends in the opposite direction to the rocking shaft 311.

Two tubular portions extending toward the bottom 27 are formed on the lid portion 310. The tubular portions are the rocking shaft 311 and the rocking wall 312, and the rocking wall 312 has a larger diameter than the rocking shaft 311.

The rocking wall 312 is inserted in the opening 26 to face an annular inner wall 224 of the stationary member 20, which is positioned close to the opening 26, substantially in parallel. The first friction member 50 is provided between the inner wall 224 and the rocking wall 312. The first friction member 50 has a bearing 510, and a flange 520 projecting in a horizontal direction from the outer surface of the bearing 510. The bearing 510 extends along the rocking wall 312 and the inner wall 224, and exhibits a tubular shape. The bearing 510 acts as a bearing for the radial load. The bearing 510 is gripped between the inner wall 224 and the rocking wall 312. When the arm 30 rocks, frictional resistance is caused between the rocking wall 312 and the bearing 510. The flange 520 acts as a thrust bearing for causing smooth rocking of the arm 30.

The rocking shaft 311 becomes smaller in outside diameter the further toward the bottom 27. The outside diameter of its tip is smaller than the inside diameter of the axial bore 223. A female thread is formed in the inner wall surface of the tip of the rocking shaft 311.

The rocking shaft 311 is inserted in the axial bore 223. A tubular second friction member 60 is provided between the rocking shaft 311 and the axial bore 223. The second friction member 60 exhibits a tapered shape becoming smaller in diameter toward the opening 26. The second friction member 60 has a bearing 61 acting as a bearing of the radial load, and a flange 62 formed along a bottom surface 221 of the cup 22. When the rocking shaft 311 rocks about the axis, frictional resistance is caused between the bearing 61 and the rocking shaft 311. The movement of the rocking shaft 311 in the axial direction is limited by the flange 62.

A disk 24 having substantially the same diameter as the flange 62 is provided at the bottom surface of the second friction member 60. An engagement bolt 23 is screwed into the tip of the rocking shaft 311 via the disk 24.

A torsion coil spring 25 is housed in the space defined by the lid portion 310 and the cup 22. The torsion coil spring 25 is formed by winding a metal material having a predetermined coil length in a spiral. One end of the torsion coil spring 25 is engaged with the lid portion 310, while the other end is engaged with the bottom surface 221. The torsion coil spring 25 always biases the arm 30 in the I direction (see FIG. 1).

In the arm 30, a columnar hole 321 is formed in the stub shaft 320. A female thread is formed on the inner wall of the columnar hole 321. A pulley 40 is rotatably attached to the stub shaft 320 through a ball bearing 42. A pulley bolt 41 is screwed into the columnar hole 321, so that the pulley 40 is fixed to the stub shaft 320. A dust shield 43 is provided between the pulley bolt 41 and the ball bearing 42.

When the arm 30 rocks, the first friction member 50 and the second friction member 60 slide between the stationary member 20 and the arm 30. Namely, the first friction member 50 slides between the inner wall 224 and the rocking wall 312, and the second friction member 60 slides between the axial bore 223 and the rocking shaft 311. Namely, the tensioner 10 is supported by the first friction member 50 and the second friction member 60 with respect to rocking of the arm 30. The first friction member 50 and the second friction member 60 have to be formed to exhibit sufficient durability against sliding with the arm 30. An explanation will be given of the first friction member 50 and the second friction member 60.

The first friction member 50 is formed using a synthetic resin, which is mainly comprised of polyphenyl sulfone (PPS), and contains partial aromatic nylon (PA-6T) shown in Japanese Patent No. 2972561, and polyether sulfone (PES) shown in Japanese Patent No. 2951321, etc.

Figure 4:
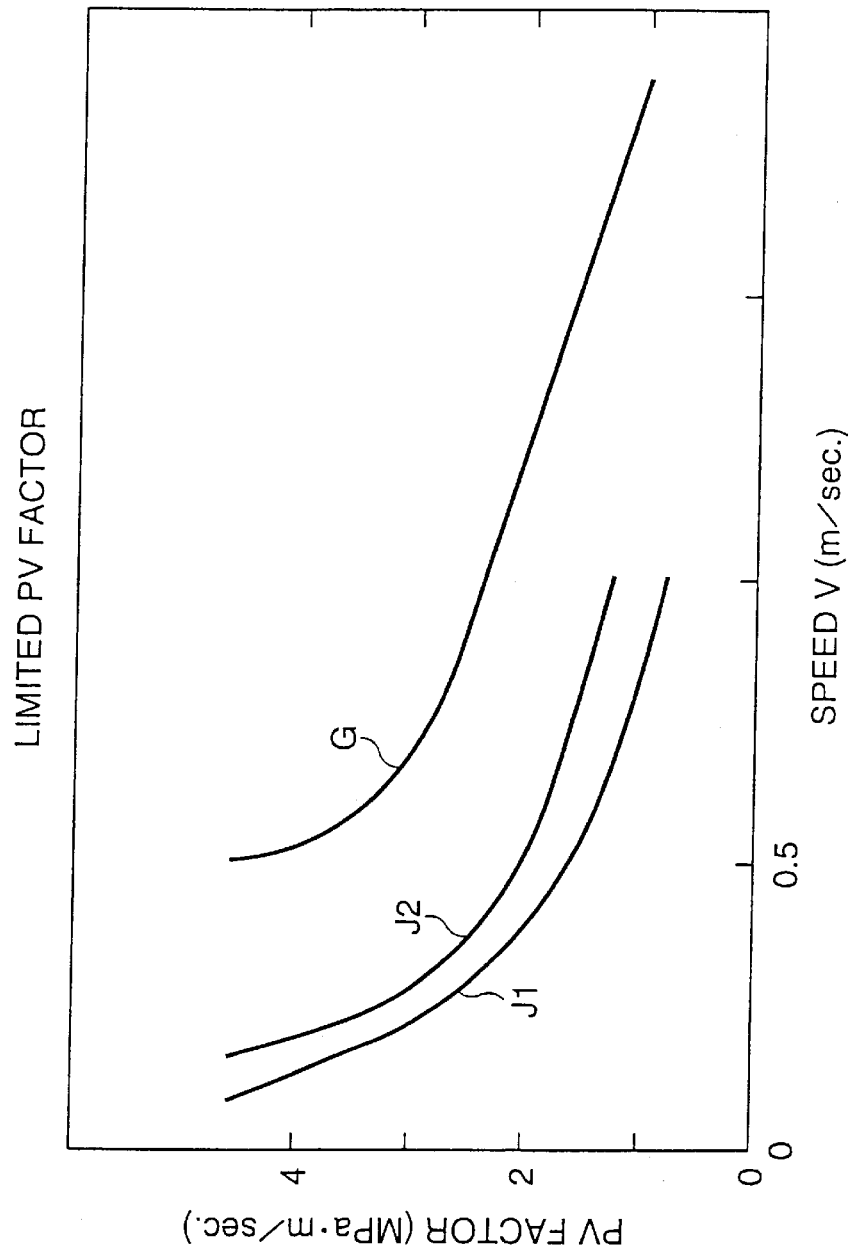
FIG. 4 is a graph for explaining a limited PV factor of a first friction member.

FIG. 4 is a graph of the limited PV factors of bearing members J1 and J2 formed from conventionally known materials, and the first friction member 50 formed by the synthetic resin G. Note that, in the drawing, the abscissa shows the speed (m/sec) under usage conditions, while the ordinate shows the PV factor (MPa·m/sec).

The bearing member J1 is made of PA-6T, while the bearing member J2 is made of PES. As understood from FIG. 4, when the arm 30 (see FIG. 3) slides with respect to the bearing members J1 and J2 by a speed of substantially 0.5 m/sec, the limited PV factor of J1 is approximately 1.6 MPa·m/sec, while the limited PV factor of J2 is approximately 2.0 MPa·m/sec. Conversely, when the arm 30 slides against the first friction member 50 under the same conditions, the first friction member 50 exhibits a limited PV factor of approximately 4.0 MPa·m/sec. Thus, the first friction member 50 made of the synthetic resin G has a limited PV factor of about twice that of the bearing members J1 and J2, and therefore has a relatively high limited PV factor.

The first friction member 50 is pressed by the rocking wall 312 by a load acting in a constant direction from the transmission belt 17 (see FIG. 1). Further, the first friction member 50 slides against the rocking wall 312 because of the rocking of the arm 30. If the tensioner 10 is used over a long period, the first friction member 50 becomes worn due to this pressing and sliding, and a problem may arise, in which the arm 30 is tilted. Conversely, in the embodiment, by making the first friction member 50 of the synthetic resin G with a high limited PV factor and a small wear factor, the durability is improved. Similarly, the second friction member 60 is also made of a material with a small wear factor.

Note that the wear factor k is defined according to the following formula:

$$\Delta w = k \cdot p \cdot v \cdot t$$

wherein $\Delta w$ is the amount of wear of the friction member, p is a pressure acting on the friction member, v is a relative speed of the friction member to the arm 30, and t is amount of time the friction member slides with the arm 30.

Since the first friction member 50 is subject to a relatively strong load as compared with the second friction member 60, the first friction member 50 is made of a material with a high limited PV factor, i.e., a material with a high withstand pressure value so as to exhibit the good durability. The loads acting on the first friction member 50 and the second friction member 60 can be calculated as described later. Note that a first peak position at which a maximum load occurs in the longitudinal direction of the first friction member 50 is designated as D1, a second peak position at which a maximum load occurs in the longitudinal direction of the second friction member 60 is designated as D2, and a third peak position at which a maximum load occurs in the pulley 40 at the pulley outer surface 411 where the transmission belt 17 runs is designated as K.

When the transmission belt 17 vibrates, a load acts on the pulley's outer surface 411 in a constant direction. The maximum load acting on the third peak position K at this time is designated as F. When the distance from the second peak position D2 to the first peak position D1 is a, and the distance from the first peak position D1 to the third peak position K is b, the load fa acting on the first peak position D1 is expressed by the formula (1):

$$fa\{(a+b)/a\} \times F \tag{1}$$

Similarly, the load fb acting on the second peak position D2 is expressed by the formula (2):

$$fb = (b/a) \times F \tag{2}$$

As can be understood from the formulas (1) and (2), the smaller the distance a, the greater the load fa acting on the first friction member 50 and the load fb acting on the second friction member 60. Namely, by extending a friction surface 51 of the first friction member 50 to the bottom 27 to position the first peak position D1 at the bottom 27 side (D'1 in FIG. 3), as shown by the broken line H in FIG. 3, it is possible to increase the loads fa and fb. If the loads fa and fb are increased, the frictional resistances occurring at the first friction member 50 and the second friction member 60 also increase, and it is possible to increase the damping force of the tensioner 10. At this time, the first friction member 50 and the second friction member 60 have to be formed so as to sufficiently withstand the loads fa and fb acting at the peak positions D1 and D2.

The area A required for the member forming the first friction member 50 to withstand the load fa is expressed by the formula (3), when the value including a margin required for securing safety with respect to the pressure value to be withstood (withstand pressure value) is P.

$$A = fa/P \tag{3}$$

As can be understood from the formula (3), the larger the withstand pressure value P, the smaller the area required for the friction surface 51. In the embodiment, since the first friction member 50 is made of a material having a high withstand pressure value P, the required area A may be made relatively small. Further, according to the formula (3), the larger the load fa, the larger the area A has to be made. Therefore, when extending the first friction member 50 and moving the first peak position D1 to the bottom 27 side (i.e., D'1) to increase the load fa, it is possible to improve the durability of the first friction member 50 by making the area A large.

After entering the formula (1) into the formula (3), the area A of the friction surface 51 is expressed by the formula (4):

$$A\{(a+b)/a\} \times F/P \tag{4}$$

Similarly, the area B of the friction surface of the second friction member 60 is expressed by the formula (5):

$$B = (b/a) \times F/P \tag{5}$$

As described above, by extending the friction surface 51 of the first friction member 50 in the direction of the bottom 27, the load fa acting on the first friction member 50 and the load fb acting on the second friction member 60 are increased. Further, by forming the first friction member 50 and the second friction member 60 so as to withstand these loads, the frictional resistance occurring due to the rocking of the arm 30 becomes greater.

The damping force of the tensioner 10 is calculated from the total of the frictional forces occurring in the first friction member 50 and the second friction member 60. That is, the damping force DF of the tensioner 10 is expressed by the formula (6). Here, $\mu 1$ is the coefficient of friction of the material forming the first friction member 50, while $\mu 2$ is the coefficient of friction of the material forming the second friction member 60.

$$DF = \mu 1 \times fa + \mu 2 \times fb \quad (6)$$

Therefore, by increasing the loads fa and fb acting on the first friction member 50 and the second friction member 60, the tensioner 10 generates a large damping force. Thus, by adjusting the loads fa and fb acting on the first friction member 50 and the second friction member 60, the damping force of the tensioner 10 can be adjusted. Note that it is of course also possible to adjust the damping force of the tensioner 10 by adjusting the coefficients of friction $\mu 1$ and $\mu 2$ of the first friction member 50 and the second friction member 60. For example, it is possible to change the coefficient of friction by blending in PTFE or another material into the synthetic resin G comprised mainly of PPS.

Next, experiment results regarding the damping force of the tensioner 10 will be described below.

Figure 5:
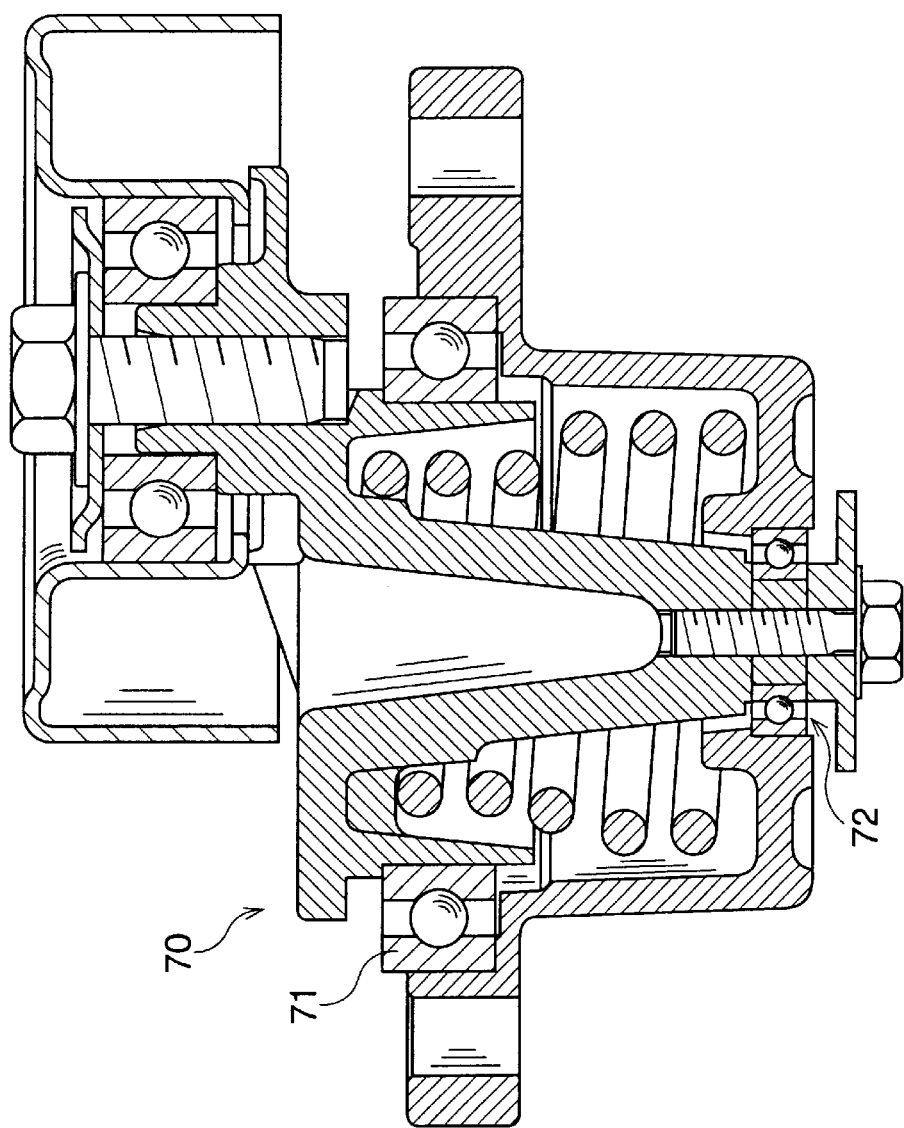
FIG. 5 is a sectional view of a tensioner manufactured for detecting the damping characteristics of the autotensioner of the first embodiment.

A tensioner 70 shown in FIG. 5 is manufactured for detecting the damping performance of the tensioner 10 of the embodiment. The structure of the tensioner 70 is different from the tensioner 10 in that a ball bearing 71 is provided instead of the first friction member 50 (see FIG. 3), and a ball bearing 72 is provided instead of the second friction member 60 (se FIG. 3). The other parts of the tensioner 70 are the same as those of the tensioner 10.

Figure 6:
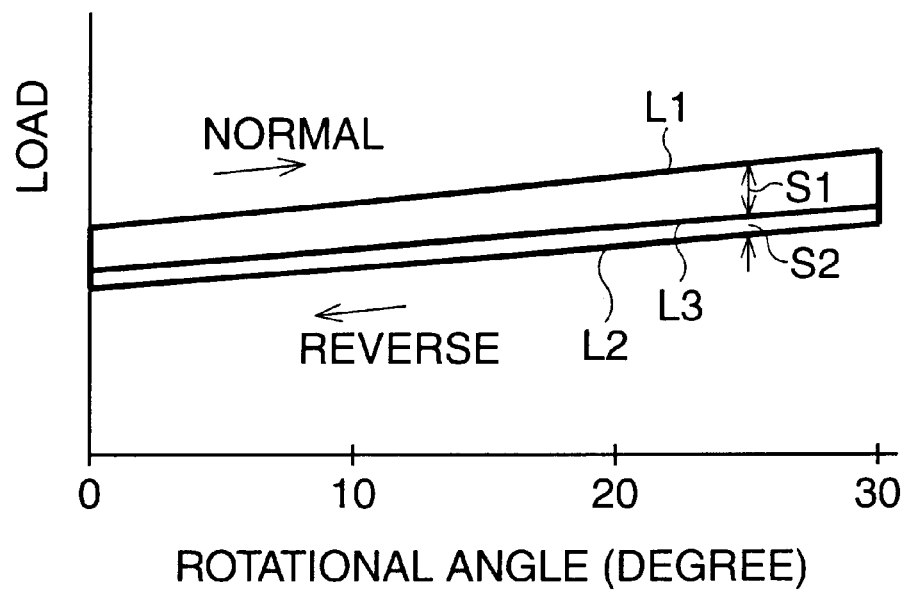
FIG. 6 is a view showing a static hysteresis of a damping force of an autotensioner of the first embodiment.

FIG. 6 shows a static hysteresis of a damping force of the tensioner 10. Solid lines L1 and L2 relate to the tensioner 10. The solid line L1 indicates a load acting on the arm 30 when the arm 30 moves or rocks in the normal direction, i.e., in the J direction (see FIG. 1), and the solid line L2 indicates a load acting on the arm 30 when the arm 30 moves in the reverse direction, i.e., in the I direction (see FIG. 1). A solid line L3 relates to the tensioner 70, and indicates a load acting on the arm 30 when the arm 30 moves in the normal or reverse direction. The rocking frequency of the arm 30 is 0.02 Hz.

As understood from FIG. 6, when the arm 30 moves in the normal direction, the load linearly increases, and when the arm 30 moves in the reveres direction, the load linearly decreases. In the tensioner 70 using the ball bearings 71 and 72, since a frictional force does not substantially act on the arm 30, the damping force acting on the arm 30 is constant regardless of the moving directions of the arm 30 (see the solid line L3). Conversely, in the tensioner 10 of the embodiment, due to the first and second friction members 50 and 60, the normal-rotation load (the solid line L1) is greater than the reverse-rotation load (the solid line L2), and the absolute value of the normal-rotation damping force (S1) is greater than the absolute value of the reverse-rotation damping force (S2). Namely, the static hysteresis of the tensioner 10 is non-bisectional.

Figures 7, 8:
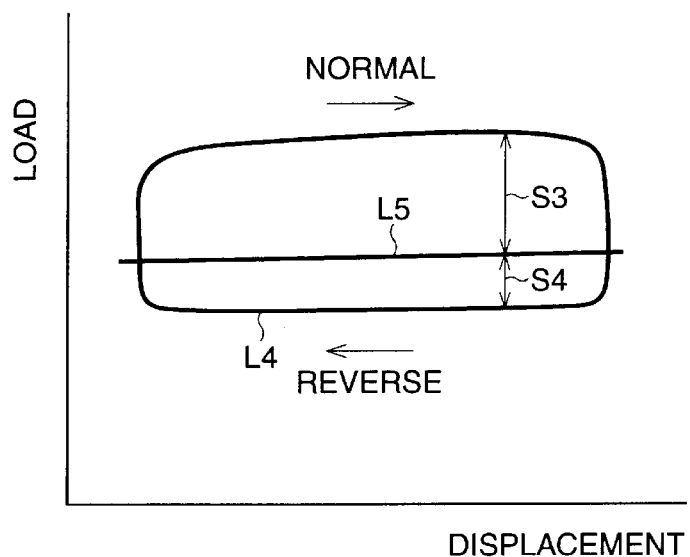
FIG. 7 is a view showing a dynamic hysteresis of a damping force of an autotensioner of the first embodiment.
FIG. 8 is a view showing a result of detecting a change of a normal-rotation damping force and a reverse-rotation damping force relative to a rocking frequency of an arm.

FIG. 7 shows a dynamic hysteresis of a damping force of the tensioners. Solid line L4 indicates the dynamic characteristics of the tensioner 10 of the embodiment. Namely, the solid line L4 indicates a relationship between the angular position of the arm 30 and the load acting on the arm 30 when the arm 30 rocks. On the other hand, the solid line L5 indicates dynamic characteristics of the tensioner 70 using the ball bearings 71 and 72. Note that the rocking frequency of the arm 30 is 20 Hz.

As understood from FIG. 7, in the tensioner 70 using the ball bearings 71 and 72, since a frictional force does not substantially act on the arm 30, the damping force acting on the arm 30 is constant regardless of the moving directions of the arm 30 (see the solid line L5). Conversely, in the tensioner 10 of the embodiment, the normal-rotation load is greater than the reverse-rotation load and a hysteresis exists as described above. Namely, the absolute value of the normal-rotation damping force (S3), which is the difference between the normal-rotation load and the load acting on the tensioner 70, is greater than the absolute value of the reverse-rotation damping force (S4), which is the difference between the reverse-rotation load and the load acting on the tensioner 70. Thus, the dynamic hysteresis of the tensioner 10 is non-bisectional similarly to the static hysteresis.

Figure 9:
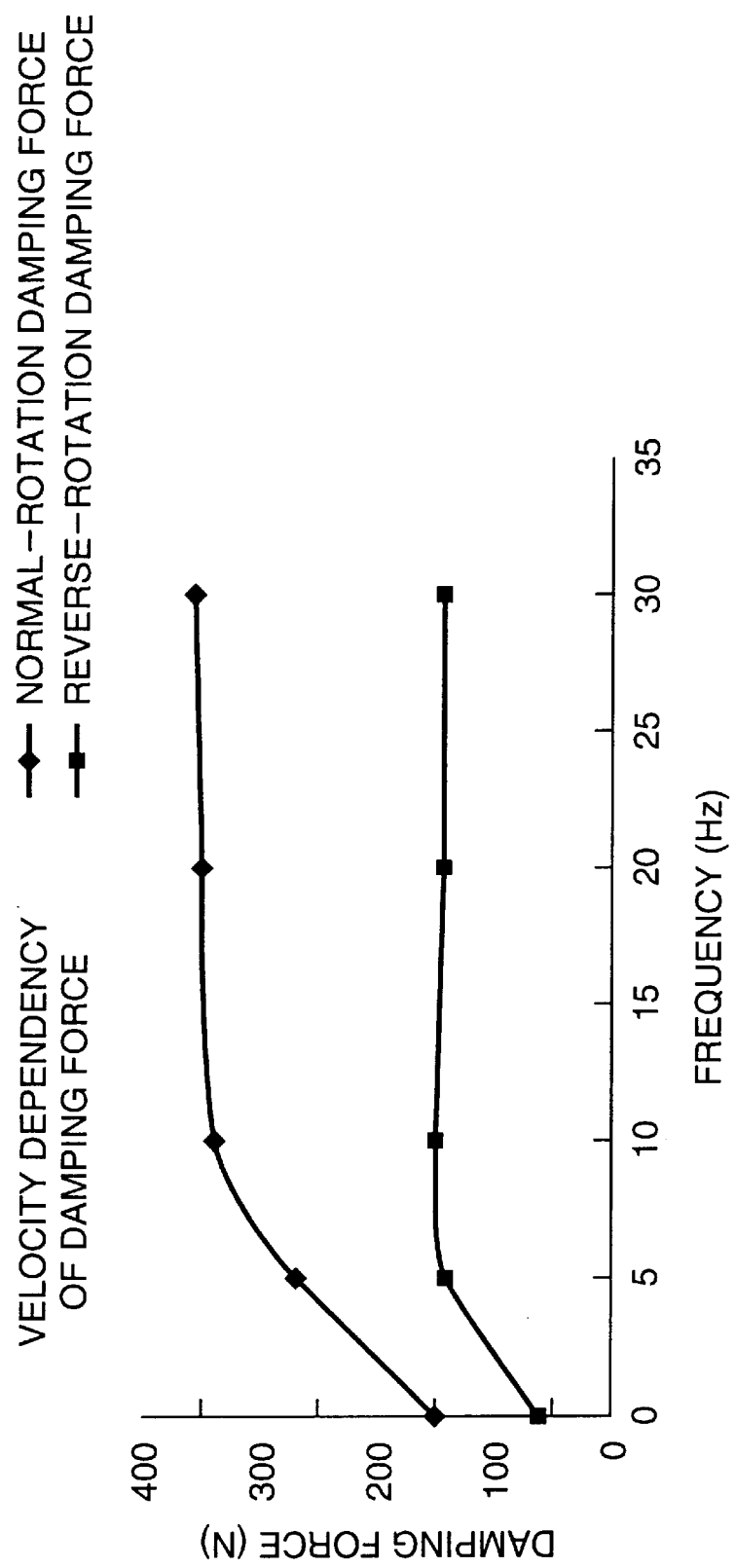
FIG. 9 is a view showing the result indicated in FIG. 8 as a graph.

FIG. 8 shows a result of detecting a change of a normal-rotation damping force and a reverse-rotation damping force relative to a rocking frequency of the arm 30, and FIG. 9 is a graph in which the results shown in FIG. 8 are indicated. As understood from the drawings, as the rocking speed or rocking frequency becomes high, the damping force increases from a state in which the rocking speed is slow (i.e., 0.02 Hz), and the damping force becomes approximately constant when the rocking frequency is over 10 Hz. Namely, the dynamic damping force acting on the arm 30 is greater than the static damping force acting on the arm 30, and when the rocking frequency is 20 Hz, for example, the dynamic damping force is approximately 2.3 times the static damping force.

In an automobile engine, the rotational frequency of an idling condition is between 20 and 30 Hz. In the tensioner 70 of the embodiment, the dynamic damping force is little changed when the number of rotations is changed under conditions higher than that of the idling condition. Namely, in the tensioner 10, the velocity dependency of the damping force under usage conditions is small, and the tension of the transmission belt is always kept constant even when the number of rotation of the engine is varied.

As described above, according to the first embodiment, the damping force generated by a tensioner is kept constant without using a C-spring.

Figure 10:
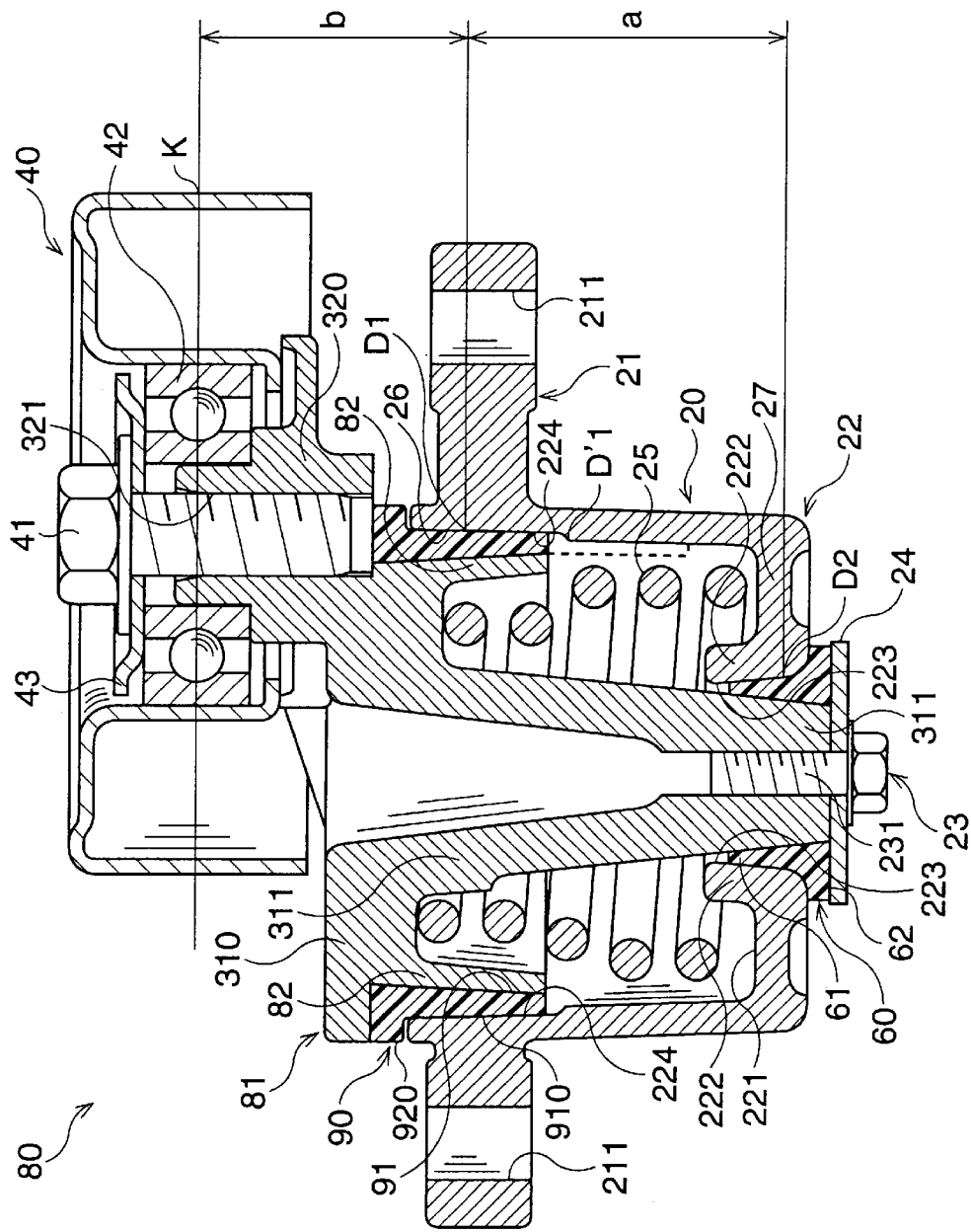
FIG. 10 is a sectional view of an autotensioner of a second embodiment.

With reference to FIG. 10, a second embodiment will be described below. Note that components that are the same as those in the first embodiment are assigned the same reference numerals.

The lid portion 81 in the tensioner 80 has a rocking wall 82 extending along the direction of the bottom 27. The rocking wall 82 faces the inner wall 224 close to the opening 26 of the cup 22 at a slant. Namely, the distance between the rocking wall 82 and the inner wall 224 becomes narrower the closer to the bottom 27.

A first friction member 90 is provided between the rocking wall 82 and the inner wall 224. The bearing portion 910 of the first friction member 90 extends along the rocking wall 82 and the inner wall 224, and exhibits a tapered shape of a narrower width toward the bottom 27. Since the tapered bearing portion 910 has a greater thickness compared with the tubular bearing 510 (see FIG. 3) in the first embodiment, the tapered bearing portion 910 exhibits a higher durability to the radial load acting on the bearing portion 910. Note that the configurations of the second friction member 60, the stationary member 20, the torsion coil spring 25, and the pulley 40 are similar to those of the first embodiment.

According to the second embodiment, it is possible to attach the first friction member 90 to the cup 20 without using a C-spring etc. in the same way as in the first embodiment. Further, according to the second embodiment, it is possible to form the bearing portion 910 having a high durability with respect to the radial load acting on the first friction member 90.

Figure 11:
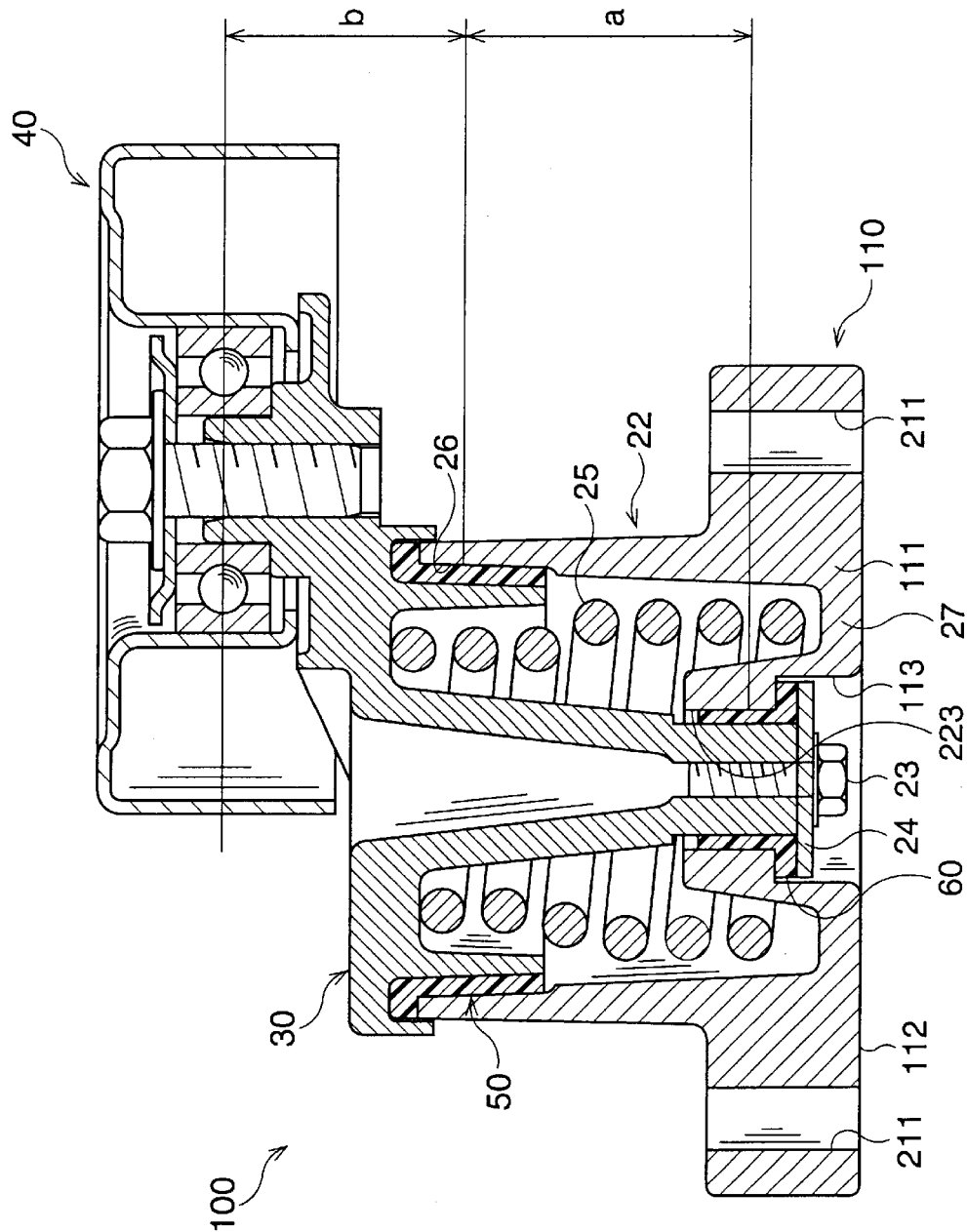
FIG. 11 is a sectional view of an autotensioner of a third embodiment.

With reference to FIG. 11, a third embodiment will be described below. Note that components that are the same as those in the first embodiment are assigned the same reference numerals.

In the tensioner 100, the mounting portion 111 of the stationary member 110 is formed at the outer circumference of the bottom 27. A bolt hole 113 sunk toward the opening 26 is formed at the center of the bottom surface 112. An engagement bolt 23 and disk 24 are provided in the bolt hole 113. The engagement bolt 23 screws with the tip of the rocking shaft 311 of the lid portion 30 through the disk 24. The second friction member 60 is interposed between the axial bore 223 and the rocking shaft 311.

The stationary member 110 is fixed to the engine block in the state with the bottom surface 112 and engine block (not shown) in abutment. The engagement bolt 23 and disk 24 are provided in the bolt hole 113, and do not interfere with the engine block. The configurations of the first friction member 50, the second friction member 60, the torsion coil spring 25, the arm 30, and the pulley 40 are similar to those of the first embodiment.

According to the third embodiment, the present invention can be applied even when it is necessary to provide the mounting portion 111 at the bottom 27 due to the form of the belt system. Thus, according to the third embodiment, it is possible to give the function of a tensioner without using a C-spring etc. with a configuration including the first friction member 50.

Note that, in the first through third embodiments, the materials and the shapes of the first friction member 50 and the second friction member 60 are determined based on the above formulas (1) to (5), but other correction formulas can be used, taking into consideration the distribution of the load acting on the friction members 50 and 60 or the wear due to use or other factors.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2001-227584 (filed on Jul. 27, 2001) and 2001-391336 (filed on Dec. 25, 2001) which are expressly incorporated herein, by reference, in their entireties.

What is claimed is:

1. An autotensioner comprising:
   a cup-shaped stationary member that has an opening and a bottom, in which an axial bore is formed;
   an arm that is attached to said opening, said arm having a rocking shaft which extends to said bottom and is inserted into said axial bore, so that said arm rocks about said rocking shaft, said arm having a stub shaft offset from said rocking shaft and extending in the opposite direction to said rocking shaft;
   a pulley that rotates about said stub shaft to give a tension to a transmission belt;
   a compression spring mounted to said arm and configured to bias said arm in a predetermined direction;
   a first friction member that is provided between an annular wall of said stationary member, which is positioned close to said opening, and a rocking wall formed on said arm, to generate a first frictional resistance by rocking of said arm; and
   a second friction member interposed between said axial bore and said rocking shaft to generate a second frictional resistance independent of the compression force of said compression spring, by rocking of said arm.

2. An autotensioner according to claim 1, wherein said first friction member has a friction surface generating said first frictional resistance with said rocking wall by rocking of said arm, the area of said friction surface being set to a size in accordance with a maximum load acting on said first friction member.

3. An autotensioner according to claim 1, wherein the area of said friction surface of said first friction member is determined by the following formula:

$$A=\{(a+b)/a\} \times F/P$$

wherein A is the area of said friction surface of said first friction member, a is the distance from a first peak position where a maximum load acts on said first friction member to a second peak position where a maximum load acts on said second friction member, b is the distance from said first peak position to a third peak position where a maximum load acts on said pulley, F is a maximum load acting on said pulley, and P is a withstand pressure of the first friction member.

4. An autotensioner according to claim 1, wherein said first friction member is made of a synthetic resin mainly comprised of polyphenyl sulfone, and said synthetic resin exhibits a limited PV factor substantially exceeding 2.0 MPa·m/sec when sliding against said arm at a speed of substantially 0.5 m/sec.

5. An autotensioner according to claim 1, wherein said rocking wall and said annular wall face each other and are substantially parallel, and said first friction member has a first bearing portion formed in a tubular shape between said rocking wall and said annular wall.

6. An autotensioner according to claim 1, wherein said rocking wall faces said annular wall at a slant, and said first friction member has a second bearing portion formed in a taper between said rocking wall and said annular wall.

7. An autotensioner according to claim 1, wherein a normal-rotation damping force, acting on said arm when said arm moves in a first direction in which said transmission belt slacks, is greater than a reverse-rotation damping force, acting on said arm when said arm moves in a second direction in which said transmission belt is tensioned.

8. An autotensioner according to claim 1, wherein a dynamic damping force acting on said arm is greater than a static damping force acting on said arm.

9. An autotensioner according to claim 8, wherein said dynamic damping force is more than two times said static damping force.

* * * * *